US012498274B2

(12) United States Patent
Krug et al.

(10) Patent No.: US 12,498,274 B2
(45) Date of Patent: Dec. 16, 2025

(54) MULTIFUNCTIONAL THERMAL EXPOSURE INDICATOR

(71) Applicant: StarKrug LLC, Lubbock, TX (US)

(72) Inventors: Baxter Douglas Whitman Krug, Lubbock, TX (US); Ian Scott Stark, Lubbock, TX (US)

( * ) Notice: Subject to any disclaimer, the term of this patent is extended or adjusted under 35 U.S.C. 154(b) by 759 days.

(21) Appl. No.: 17/815,066

(22) Filed: Jul. 26, 2022

(65) Prior Publication Data
US 2024/0035901 A1  Feb. 1, 2024

(51) Int. Cl.
G01K 11/18 (2006.01)
G01N 31/22 (2006.01)

(52) U.S. Cl.
CPC ......... *G01K 11/18* (2013.01); *B41M 2205/42* (2013.01); *G01N 31/229* (2013.01)

(58) Field of Classification Search
CPC ...... G01K 1/02; G01K 3/04; G01K 11/12–20; G01N 31/229; B41M 2205/40; B41M 2205/42
See application file for complete search history.

(56) References Cited

U.S. PATENT DOCUMENTS

| 7,829,162 | B2 | 11/2010 | Eskra et al. |
| 8,066,432 | B2 * | 11/2011 | Yang ............... G01K 11/18 374/162 |
| 8,546,301 | B2 | 10/2013 | Ribi et al. |
| 8,569,208 | B1 | 10/2013 | Ribi |
| 8,652,996 | B2 | 2/2014 | Kwan |
| 9,452,262 | B2 | 9/2016 | Pommerau et al. |
| 10,758,683 | B2 | 9/2020 | Gibson et al. |
| 11,131,656 | B2 * | 9/2021 | Prusik ............. G01K 3/04 |
| 12,247,884 | B2 * | 3/2025 | Smith ............. G01K 1/02 |
| 2006/0249949 | A1 * | 11/2006 | Fortune ............. E03D 13/005 374/E11.018 |
| 2010/0247900 | A1 | 9/2010 | Parker et al. |
| 2015/0051579 | A1 | 2/2015 | Chung et al. |
| 2015/0308901 | A1 * | 10/2015 | Salman ............. G01K 3/04 374/102 |
| 2016/0349225 | A1 * | 12/2016 | Prusik ............. G01K 11/12 |
| 2017/0363479 | A1 * | 12/2017 | Harvey ............. G01K 11/12 |
| 2020/0165038 | A1 | 5/2020 | Weisbecker et al. |
| 2020/0309607 | A1 * | 10/2020 | Small ............. C09K 9/02 |
| 2025/0198855 | A1 * | 6/2025 | Smith ............. G01K 1/02 |

FOREIGN PATENT DOCUMENTS

| EP | 2772523 B1 | 11/2018 |
| ES | 2305155 T3 | 11/2008 |
| JP | 2003315167 A | 11/2003 |
| JP | 2017038292 A1 | 5/2018 |
| MX | 06006673 A | 8/2006 |
| WO | 1997037857 A1 | 10/1997 |
| WO | 2006118820 A2 | 11/2006 |
| WO | 2019092355 A1 | 5/2019 |
| WO | 2020203603 A1 | 10/2020 |

* cited by examiner

*Primary Examiner* — Randy W Gibson
(74) *Attorney, Agent, or Firm* — The Patent Agency; Gaurav Goel

(57) ABSTRACT

A multifunctional thermal exposure indicator can provide immediate reversible indications of overtemperature as well as irreversible indications of excessive thermal loading. Additionally, the multifunctional thermal exposure indicator can provide semi-reversible indications of undertemperature thermal loading, such as exposure to temperatures below the freezing point of water.

38 Claims, 4 Drawing Sheets

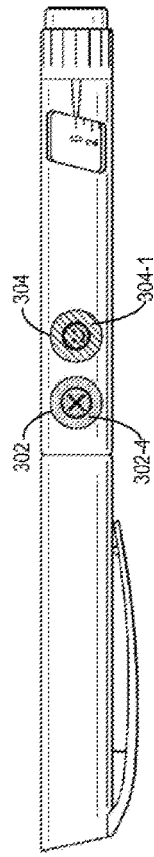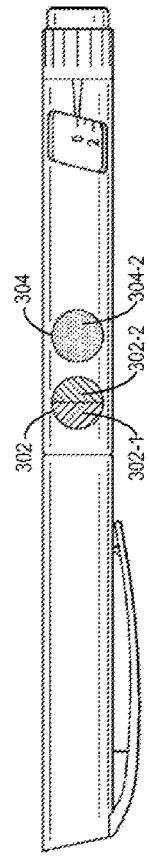
FIG. 3C
FIG. 3D

MULTIFUNCTIONAL THERMAL EXPOSURE INDICATOR

BACKGROUND

Field of the Disclosure

The present disclosure relates generally to monitoring thermal exposure of objects and, more particularly, to a multifunctional thermal exposure indicator.

Description of the Related Art

Thermochromic pigments have been used to develop thermochromic indicators for detecting temperature, such as associated with an object. In particular, thermochromic indicators that change color upon reaching a threshold temperature have been developed, for example, to detect and display an overtemperature condition of the object that may be deleterious.

However, many practical applications of detecting temperature of an object actually involve thermal exposure or exposure to a given temperature range for a duration in time, rather than just an immediate overtemperature condition. For example, a temperature sensitive substance may degrade after a certain amount of heat is absorbed and may be capable of withstanding short exposures to an overtemperature condition without substantial damage. Thus, a certain degree of reversibility may be desirable for a thermochromic indicator for the temperature sensitive substance.

Furthermore, after some cumulative exposure to a given thermal load, the temperature sensitive substance may permanently be degraded such that permanence of the thermochromic indicator is also desirable. For example, for thermal monitoring of a temperature sensitive medication, a combination of reversible and permanent thermochromic indications is needed to show a patient whether the medication is still usable or irreversibly damaged by excessive thermal exposure.

SUMMARY

In one aspect, a thermal exposure indicator is disclosed. The thermal exposure indicator can include a first multilayer indicator enabled for affixing to an object to be monitored for thermal exposure. In the thermal exposure indicator, the first multilayer indicator can include a first sublayer comprising a first design that is non-thermochromic, a second sublayer in contact with and overlaid on the first sublayer, the second sublayer comprising a first thermochromic pigment that irreversibly transitions from a first color to transparent when exposed to temperatures exceeding a first threshold temperature for longer than a first duration. In the thermal exposure indicator, when the second sublayer is transparent, the first sublayer can be visible through the second sublayer. In the thermal exposure indicator, the first multilayer indicator can further include a third sublayer in contact with and overlaid on the second sublayer. In the thermal exposure indicator, the third sublayer can further include a first portion comprising a second thermochromic pigment that is reversible from a second color to a third color depending on whether the temperatures exceed a second threshold temperature that is lower than the first threshold temperature, while the third color can be transparent or opaque. In the thermal exposure indicator, the third sublayer can further include a second portion comprising a third thermochromic pigment that undergoes a transition from a fourth color to transparent depending on whether the temperatures exceed a third threshold temperature for a second duration. In the thermal exposure indicator, when the second portion is transparent, the second sublayer can be visible through the second portion, while the second portion remains irreversible with respect to the transition when the temperatures exceed a fourth threshold temperature.

In any of the disclosed embodiments, the thermal exposure indicator can further include a second multilayer indicator enabled for affixing to the object. In the thermal exposure indicator, the second multilayer indicator can further include a fourth sublayer comprising a second design that is non-thermochromic, and a fifth sublayer in contact with and overlaid on the fourth sublayer, the fifth sublayer comprising a fourth thermochromic pigment that transitions from transparent to a fifth color depending on whether the temperatures fall below a fifth threshold temperature.

In any of the disclosed embodiments of the thermal exposure indicator, the first portion and the second portion can each cover about half of a surface area of the third sublayer.

In any of the disclosed embodiments of the thermal exposure indicator, the first sublayer, the second sublayer, and the third sublayer can cover about the same surface area and are aligned with each other.

In any of the disclosed embodiments of the thermal exposure indicator, the third threshold temperature can range from about 27.8° C. to about 29.4° C. and the second duration can be at least 15 minutes.

In any of the disclosed embodiments of the thermal exposure indicator, the first threshold temperature can be about 29.4° C. and the first duration can be at least 60 minutes.

In any of the disclosed embodiments of the thermal exposure indicator, the first threshold temperature can be about 35° C. and the first duration can be at least 15 minutes.

In any of the disclosed embodiments of the thermal exposure indicator, visibility of the first design can indicate excessive thermal exposure of the object.

In any of the disclosed embodiments of the thermal exposure indicator, visibility of the second design can indicate no excessive cold exposure of the object.

In any of the disclosed embodiments of the thermal exposure indicator, the first multilayer indicator and the second multilayer indicator can be affixed to a sixth sublayer comprising a thin metallic foil. In the thermal exposure indicator, the sixth sublayer can be enabled for affixing to the object, while the first multilayer indicator and the second multilayer indicator can be covered with a seventh sublayer including a transparent layer that is insulating and protective.

In any of the disclosed embodiments of the thermal exposure indicator, the object can include a packaging enabled for storing contents of the object, while the object being monitored for thermal exposure further can further include the contents being monitored for thermal exposure.

In any of the disclosed embodiments of the thermal exposure indicator, the contents can include a medication. In any of the disclosed embodiments of the thermal exposure indicator, the object can be an insulin pen and the medication can include an insulin.

In any of the disclosed embodiments of the thermal exposure indicator, the first multilayer indicator can be circular in shape, while both the first portion and the second portion can be semi-circular in shape.

In any of the disclosed embodiments of the thermal exposure indicator, appearance of the third color or the first color can indicate an overtemperature condition of the object.

In any of the disclosed embodiments of the thermal exposure indicator, appearance of the fourth color can indicate no permanent thermal damage to the object.

In any of the disclosed embodiments of the thermal exposure indicator, appearance of the fifth color can indicate excessive cold exposure of the object.

In any of the disclosed embodiments of the thermal exposure indicator, the first thermochromic pigment can be uniformly distributed over the second sublayer.

In any of the disclosed embodiments of the thermal exposure indicator, the fourth threshold temperature and the fifth threshold temperature can be the freezing point of water.

In another aspect, an object enabled for thermal exposure monitoring is disclosed. The object can include a thermal exposure indicator in contact with the object. In the object, the thermal exposure indicator can further include a first multilayer indicator enabled for affixing to the object. In the object, the first multilayer indicator can include a first sublayer comprising a first design that is non-thermochromic, and a second sublayer in contact with and overlaid on the first sublayer, the second sublayer comprising a first thermochromic pigment that irreversibly transitions from a first color to transparent when exposed to temperatures exceeding a first threshold temperature for longer than a first duration. In the object, when the second sublayer is transparent, the first sublayer can be visible through the second sublayer. In the object, the first multilayer indicator can further include a third sublayer in contact with and overlaid on the second sublayer. In the object, the third sublayer can further include a first portion including a second thermochromic pigment that is reversible from a second color to a third color depending on whether the temperatures exceed a second threshold temperature that is lower than the first threshold temperature. In the object, the third color can be transparent or opaque. In the object, the third sublayer can further include a second portion including a third thermochromic pigment that undergoes a transition from a fourth color to transparent depending on whether the temperatures exceed a third threshold temperature for a second duration. In the object, when the second portion is transparent, the second sublayer can be visible through the second portion, while the second portion can remain irreversible with respect to the transition when the temperatures exceed a fourth threshold temperature.

In any of the disclosed embodiments of the object, the thermal exposure indicator can further include a second multilayer indicator enabled for affixing to the object. In the object, the second multilayer indicator can further include a fourth sublayer comprising a second design that is non-thermochromic, and a fifth sublayer in contact with and overlaid on the fourth sublayer, the fifth sublayer comprising a fourth thermochromic pigment that transitions from transparent to a fifth color depending on whether the temperatures fall below a fifth threshold temperature.

In any of the disclosed embodiments of the object, the first portion and the second portion can each cover about half of a surface area of the third sublayer.

In any of the disclosed embodiments of the object, the first sublayer, the second sublayer, and the third sublayer can cover about the same surface area and can be aligned with each other.

In any of the disclosed embodiments of the object, the third threshold temperature can range from about 27.8° C. to 29.4° C. and the second duration can be at least 15 minutes.

In any of the disclosed embodiments of the object, the first threshold temperature can be about 29.4° C. and the first duration can be at least 60 minutes.

In any of the disclosed embodiments of the object, the first threshold temperature can be about 35° C. and the first duration can be at least 15 minutes.

In any of the disclosed embodiments of the object, visibility of the first design can indicate excessive thermal exposure of the object.

In any of the disclosed embodiments of the object, visibility of the second design can indicate no excessive cold exposure of the object.

In any of the disclosed embodiments of the object, the first multilayer indicator and the second multilayer indicator can be affixed to a sixth sublayer comprising a thin metallic foil, while the sixth sublayer can be enabled for affixing to the object. In any of the disclosed embodiments of the object, the first multilayer indicator and the second multilayer indicator can be covered with a seventh sublayer including a transparent layer that is insulating and protective.

In any of the disclosed embodiments, the object can further include a packaging enabled for storing contents of the object, while the object being monitored for thermal exposure can further include the contents being monitored for thermal exposure. In any of the disclosed embodiments of the object, the contents can include a medication. In any of the disclosed embodiments of the object, the packaging can include an insulin pen and the medication can include an insulin.

In any of the disclosed embodiments of the object, the first multilayer indicator can be circular in shape, while both the first portion and the second portion can be semi-circular in shape.

In any of the disclosed embodiments of the object, appearance of the third color or the first color can indicate an overtemperature condition of the object.

In any of the disclosed embodiments of the object, appearance of the fourth color can indicate no permanent thermal damage to the object.

In any of the disclosed embodiments of the object, appearance of the fifth color can indicate excessive cold exposure of the object.

In any of the disclosed embodiments of the object, the first thermochromic pigment can be uniformly distributed over the second sublayer.

In any of the disclosed embodiments of the object, the fourth threshold temperature and the fifth threshold temperature can be the freezing point of water.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner. For a more complete understanding of the present disclosure and its features and advantages, reference is now made to the following description, taken in conjunction with the accompanying drawings.

FIGS. 3A, 3B, 3C, and 3D are depictions of a packaged medication with multifunctional thermal exposure indicators.

DETAILED DESCRIPTION

Figure 1:
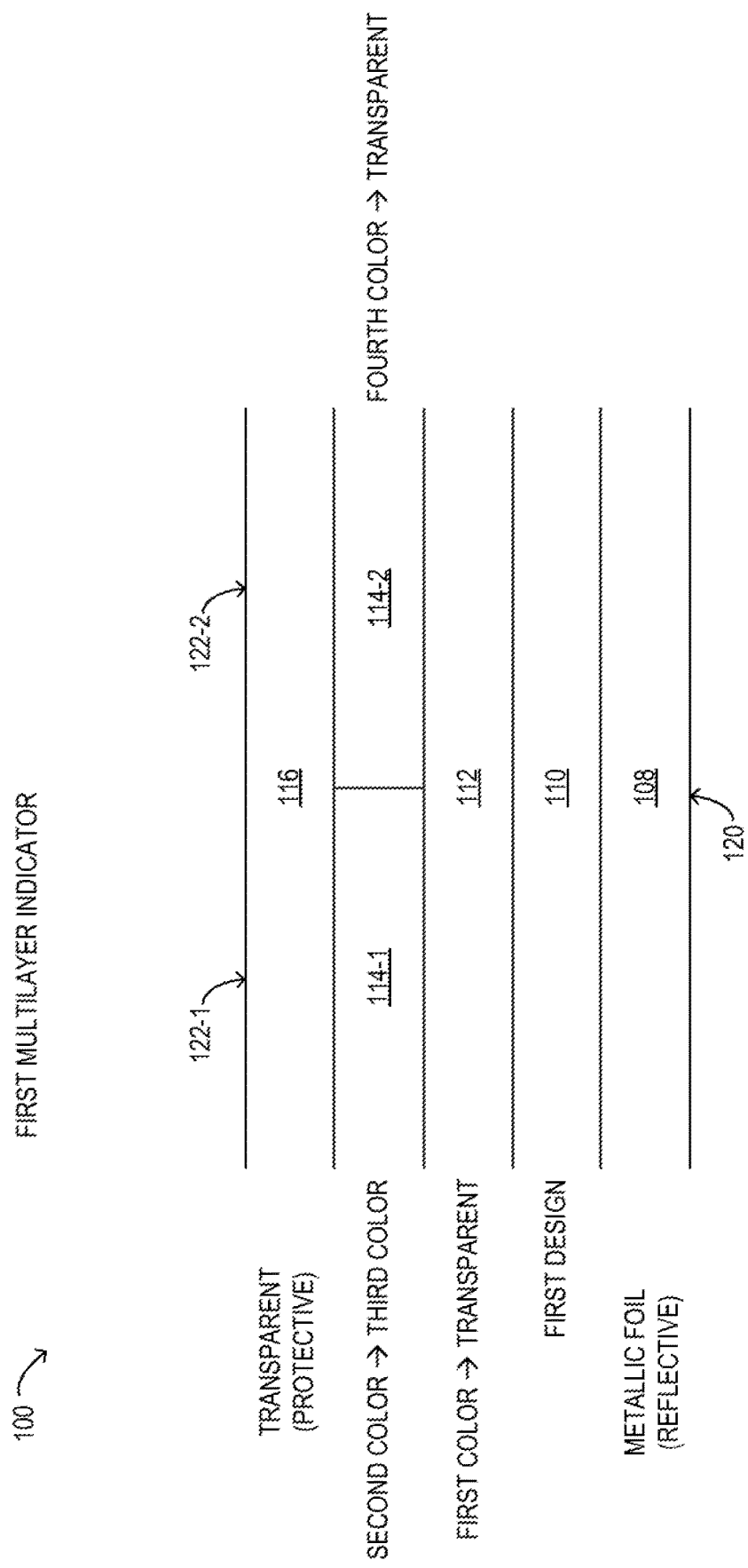
FIG. 1 is a depiction of a first multilayer indicator of a multifunctional thermal exposure indicator.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Many temperature-sensitive substances, such as certain medications or chemicals or foodstuffs, among other substances, may be manufactured at industrial scale, and then, may be packaged into smaller quantities for distribution and sale to individual consumers. When stored at industrial scale, thermal load and temperature monitoring equipment may be available for larger quantities of the substance, where general observations about ambient environmental conditions can be useful to monitor and prevent thermal degradation. However, such industrial equipment is not suitable for and is not available for thermal load monitoring of individual packaged quantities of the same substance. Thus, for many packaged substances used by consumers, no simple technology may be available to detect thermal loading and indicate whether thermal degradation has or has not affected the substances while still in individual consumer packaging, and for each individual unit of the packaging.

In various applications where such thermal load monitoring is indicated, the substance may be in solid, semisolid, semiliquid, or liquid form; the substance may be a pure substance or a mixture or a solution; the substance may be a medication for humans or animals that is taken internally or ingested or applied externally or applied topically, or that is injected subcutaneously or venously; the substance may comprise perishable food; and the substance may comprise chemicals with various degrees of thermal stability or volatility.

In one particular non-limiting example of a temperature-sensitive substance, the medication insulin is widely used as a treatment for diabetes and is delivered to patients as a clear liquid in individual packaged quantities, such as in a pen injector or in a vial. Diabetes patients may receive the packaged insulin and may be indicated to inject an amount of the insulin several times per day, such as prior to meals, for example. Thus, the packaged insulin is often taken by patients with them away from the home, such as while at work or while traveling or for other purposes.

As a result, the packaged insulin may be subject to various environmental conditions, including overtemperature conditions that can damage the insulin and render it medically unusable. Because insulin is very sensitive to overtemperature exposure, the packaged insulin may easily be subject to higher temperatures than is safe for the medication and may thermally degrade before use by the patient. Thus, the packaged insulin can be subject to thermal degradation from environmental conditions that may not be apparent to the patient by visible inspection of the packaged insulin itself. When such thermal degradation does occur with packaged insulin, there may be no visible change in the packaged insulin that is apparent to the patient, and the patient may unknowingly inject insulin that is thermally degraded and is no longer medically useful. The consequences of using such thermally degraded insulin may involve significant medical consequences relating to untreated diabetes that can even be life-threatening in some circumstances. Other adverse side effects may result from injecting the degradation products of the packaged insulin that has thermally degraded. On the other hand, the packaged insulin may be able to sustain short periods in an overtemperature environment with very little or acceptable amounts of degradation that does not render it unusable.

Furthermore, when the packaged insulin is stored by patients at home, the patient is typically instructed to store the medication under refrigeration to prolong shelf life. If for some reason, the level of refrigeration is inadequate, then the packaged insulin may also thermally degrade. Conversely, if for some reason the packaged insulin is subject to temperatures below the freezing point of water, the insulin will become unusable and should not be injected, but should be discarded. Thus, for the example substance of packaged insulin medication, various types of temperature and thermal load monitoring may be involved with indicating that a particular unit of packaged insulin remains safe and effective for use by patients. As noted above, a combination of reversible and permanent thermochromic indications is thus needed to show whether a substance subject to thermal degradation or unwanted freezing is still usable or irreversibly damaged by excessive exposure to overtemperature or undertemperature conditions.

As disclosed in further detail herein, a multifunctional thermal exposure indicator can provide a combination of reversible and permanent thermochromic indications for thermally monitoring an object associated with a substance. For example, the object may be a form of individual packaging for the substance. The multifunctional thermal exposure indicator disclosed herein may comprise an adhesive label further comprised of a multilayer indicator that is suitable for affixing to individual packaging for the substance. The multifunctional thermal exposure indicator disclosed herein may include a reversible indicator that responds immediately to an overtemperature condition. The multifunctional thermal exposure indicator disclosed herein may include a semi-reversible or irreversible indicator that responds after a period of exposure to an overtemperature condition. The multifunctional thermal exposure indicator disclosed herein may include an irreversible indicator that responds after a sustained period of exposure to an overtemperature condition. The multifunctional thermal exposure indicator disclosed herein may include a semi-reversible or irreversible indicator that responds after a period of exposure to an undertemperature condition, such as the freezing point of water. The multifunctional thermal exposure indicator disclosed herein may include a base layer that is metallic and reflective. The multifunctional thermal exposure indicator disclosed herein may include a cover layer that is protective and transparent. In this manner, the multifunctional thermal exposure indicator disclosed herein may be suitable for use by consumers of the substance having possession of the individual packaging for the substance.

Referring now to the drawings, FIG. 1 illustrates a first multilayer indicator 100 depicted as a plurality of sublayers in cross-section. It is noted that FIG. 1 is not drawn to scale or perspective. In particular, it is noted that the thickness of individual sublayers depicted as uniform in FIG. 1 may vary (not shown) or may be substantially similar to each other. Furthermore, an overall shape and size of first multilayer indicator 100 may vary in different embodiments.

Furthermore, in FIG. 1, various sublayers are shown, as will now be described in detail. The various sublayers associated with first multilayer indicator 100 may be bonded or attached to one another, such that adjacent sublayers are in contact with each other, and may be overlaid on each other in the stacked arrangement depicted. Various types of bonding or attaching methods may be used to join the sublayer to each other, such as but not limited to: thermal bonding, pressure bonding, chemical bonding, adhesive bonding, as well as various combinations thereof, among others. It is noted that the term "in contact with" refers to adjacent sublayers bonded together with or without an intermediate adhesive, when applied to maintain the bond.

In FIG. 1, first multilayer indicator 100 may be formed as an adhesive label having an overall thickness commensurate with one or more sheets of normal paper. Thus, first multilayer indicator 100 may be formed to be suitable for affixing to various types of objects, such as by having a size and shape commensurate to various given objects. Furthermore, first multilayer indicator 100 may be sufficiently thin and small to have a relatively small thermal mass with respect to the object that first multilayer indicator 100 thermally monitors. Thus, even when first multilayer indicator 100 is formed with at least some thermally insulating materials, first multilayer indicator 100 may exhibit suitable thermal conductivity (from sufficient thinness and sufficiently low mass) to indicate, within acceptable tolerances for thermal accuracy and thermal precision, the thermal condition of the object that first multilayer indicator 100 is affixed to.

As shown in FIG. 1, first multilayer indicator 100 may comprise a metallic foil 108 that can serve as a base layer, thereby forming a bottom surface 120 of first multilayer indicator 100. Accordingly, bottom surface 120 may be affixed to an object that first multilayer indicator 100 is used to thermally monitor, such as for immediate thermal exposure or cumulative thermal load exposure or both. Specifically, bottom surface 120 may be subject to bonding to the object using an adhesive (not shown). It is further noted that in some embodiments of first multilayer indicator 100, metallic foil 108 may be omitted, such that a first design sublayer 110 forms a bottom surface (not shown).

In FIG. 1, first design sublayer 110 is shown in contact with and overlaid on metallic foil 108. First design sublayer 110 may include a fixed pattern or design that is recognizable to a viewer of first multilayer indicator 100, such as a viewer viewing first multilayer indicator 100 from a top surface 122, as will be described further below. In some embodiments, first design sublayer 110 may be a printed sublayer, such as by using an ink. In various embodiments, at least some portions of first design sublayer 110 may be opaque to incident light, while at least some portions of first multilayer indicator 100 may be transparent or semi-transparent. Whether due to transparency or semi-transparency within first design sublayer 110, metallic foil 108, which is typically reflective and opaque, may serve to reflect incident light on first multilayer indicator 100 back through first design sublayer 110, which may improve visibility of first design sublayer 110 or portions thereof. It is noted that visibility of at least some portions of first design (not visible in FIG. 1) included in first design sublayer 110 may indicate excessive thermal exposure of first multilayer indicator 100 or of the object that first multilayer indicator 100 is affixed to.

Also shown in FIG. 1, is a second sublayer 112 that is depicted in contact with and overlaid on first design sublayer 110. Second sublayer 112 may be formed using a first thermochromic pigment that is enabled to transition from a first color to transparent when exposed to temperatures exceeding a first threshold temperature for longer than a first duration. In particular, when second sublayer 112 is transparent, first design sublayer 110 can be visible through second sublayer 112. When second sublayer 112 has the first color, second sublayer 112 can be opaque or substantially opaque.

For example, when the object that first multilayer indicator 100 thermally monitors comprises packaged insulin, second sublayer 112 may transition from the first color to transparent upon exposure to temperatures above 29.4° C. (85° F.) for at least 60 minutes or upon exposure to temperatures above 35° C. (95° F.) for at least 15 minutes, as examples of pairs of values for the first threshold temperature and the first duration.

Further shown in FIG. 1, is a third sublayer 114 that is depicted in contact with and overlaid on second sublayer 112. Third sublayer 114 is shown having a first portion 114-1 and a second portion 114-2 that are adjacent to each other, and thus, concurrently visible. Although first portion 114-1 and second portion 114-2 are shown substantially equal in size in FIG. 1, it is noted that first portion 114-1 and second portion 114-2 may individually vary in size and shape. In some embodiments, first multilayer indicator 100 can be circularly shaped, while first portion 114-1 and second portion 114-2 are semi-circularly shaped, for example.

In first multilayer indicator 100, first portion 114-1 may be formed using a second thermochromic pigment that is enabled to reversibly transition from a second color to a third color when exposed to temperatures exceeding a second threshold temperature that is lower than the first threshold temperature. In some embodiments, the third color con be partially or substantially transparent. In some embodiments, both the second color and the third color can be opaque or substantially opaque, such that first portion 114-1 can be opaque or substantially opaque. Second portion 114-2 can be formed using a third thermochromic pigment that is enabled to transition from a fourth color to transparent when exposed to temperatures exceeding a third threshold temperature for a second duration. Thus, when second portion 114-2 is transparent, second sublayer 112 becomes visible through second portion 114-2. When second sublayer 112 is also transparent, then at least some of first design sublayer 110 becomes visible through second portion 114-2. Furthermore, when second portion 114-2 is exposed to temperatures exceeding a fourth threshold temperature, the transition of second portion 114-2 to transparent can become irreversible, For example, when the object that first multilayer indicator 100 thermally monitors comprises packaged insulin, first portion 114-1 may reversibly transition from the second color to the third color upon exposure to temperatures above 25° C. (77° F.) and may revert to the second color at lower temperatures. Concurrently, second portion 114-2 may irreversibly transition from the fourth color to transparent when exposed to temperatures between 27.8° C. (82° F.) and 29.4° C. (85° F.) for a duration of at least 15 minutes, as long as the temperatures remain above the freezing point of water. It is noted that second portion 114-2 may transition back to the fourth color when exposed to temperatures substantially below the freezing point of water.

Also shown covering third sublayer 114 in FIG. 1 is a transparent layer 116 that may form a protective external barrier for first multilayer indicator 100 that can protect against mechanical wear, abrasion, and tampering, and can be stable with respect to sudden or momentary temperature variations. Transparent layer 116 may accordingly be formed from a suitable transparent polymer, for example, among other materials.

In operation and use of first multilayer indicator 100, the appearance of the second color at a surface location 122-1 may indicate a normal temperature range, while the appearance of the third color may indicate an immediate overtemperature condition, such as greater than room temperature. In some embodiments, when the third color is transparent, appearance of the first color may indicate an immediate overtemperature condition. Meanwhile, at a surface location 122-2, the fourth color may appear to indicate no or minimal thermal loading; the first color may appear to indicate an intermediate amount of thermal loading; and the first design may appear to indicate excessive thermal loading.

Figure 2:
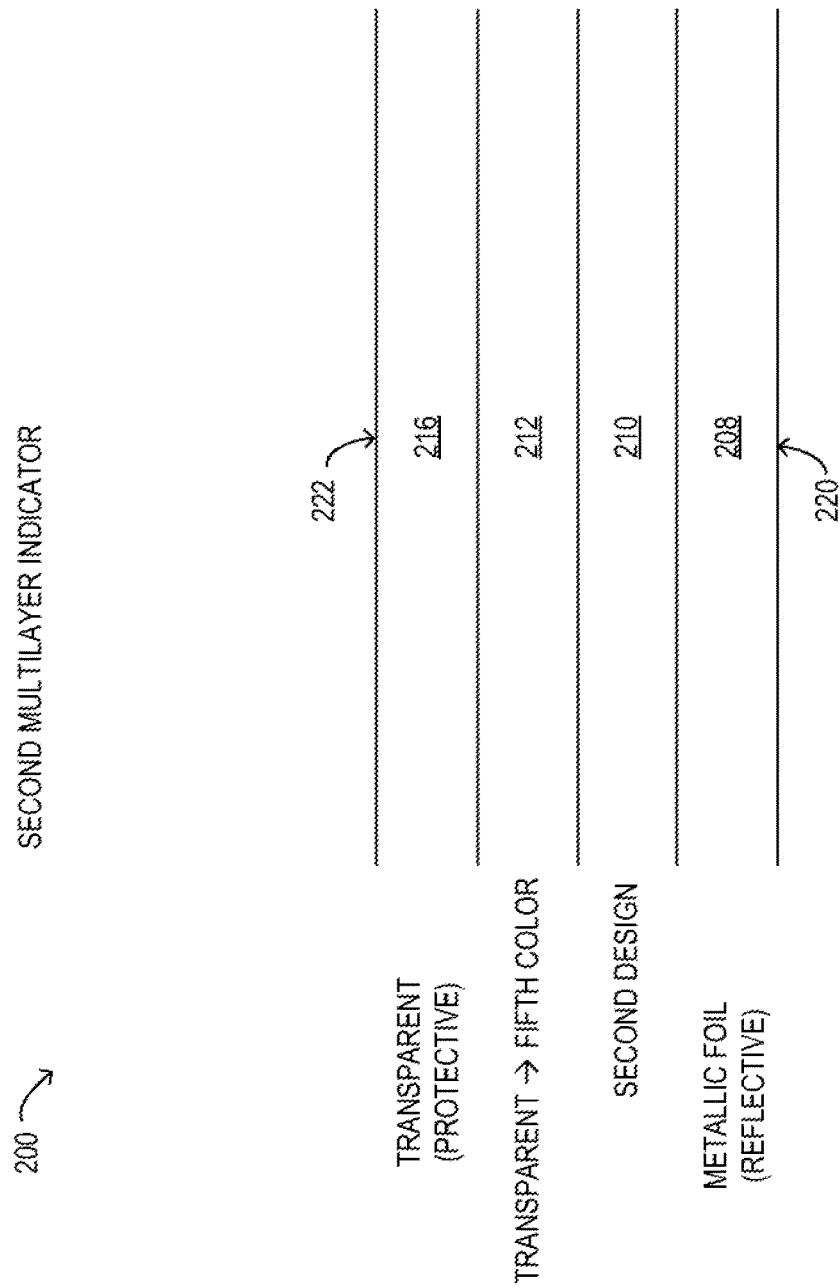
FIG. 2 is a depiction of a second multilayer indicator of a multifunctional thermal exposure indicator.

Turning now to FIG. 2, a second multilayer indicator 200 is depicted as a plurality of sublayers in cross-section. It is noted that FIG. 2 is not drawn to scale or perspective. In particular, it is noted that the thickness of individual sublayers depicted as uniform in FIG. 2 may vary (not shown) or may be substantially similar to each other. Furthermore, an overall shape and size of second multilayer indicator 200 may vary in different embodiments.

In second multilayer indicator 200, a bottom surface 220 may be substantially similar to bottom surface 120 of first multilayer indicator 100; a metallic foil 208 may be substantially similar to metallic foil 108 of first multilayer indicator 100, and a second design sublayer 210 may be substantially similar to first design sublayer 110 of first multilayer indicator 100.

As shown in FIG. 2, second multilayer indicator 200 may monitor and indicate prolonged exposure to cold or undertemperature conditions. For example, second multilayer indicator 200 may be used to indicate a condition of substances that do not remain stable when subject to freezing temperatures for water.

Accordingly, in second multilayer indicator 200, second design sublayer 210 may represent a fourth sublayer comprising a second design. Second multilayer indicator 200 is also shown comprising a fifth sublayer 212 in contact with and overlaid on the fourth sublayer. Fifth sublayer 212 may comprise a fourth thermochromic pigment that transitions from transparent to a fifth color when exposed to temperatures below a fifth threshold temperature. It is noted that fifth sublayer 212 may be formed using a similar thermochromic composition as second sublayer 112 (see FIG. 1) but with a different transition with an initial transparent state. The fifth color can be opaque or substantially opaque, such that appearance of the second design at a surface 222 can indicate an unadulterated or safe condition that has not been subject to undertemperature exposure, such as below the freezing point of water.

Turning now to FIGS. 3A, 3B, 3C, and 3D, various states of a packaged medication 300 are depicted that includes multifunctional thermal exposure indicators 302 and 304, or simply "indicators" 302 and 304 as used herein. As shown, packaged medication 300 is depicted as an injector pen, such as widely used for administering insulin, among other medications. An injector pen allows for dialing in a precise volume of a single dose of an injectable liquid, and then injecting that precise volume. It is noted that various other types of packaged medication, in addition to injector pens, may be used with indicators 302 and 304. Although the outward appearance of indicators 302 and 304 is depicted using black-line patterns in FIGS. 3A, 3B, 3C, and 3D, it will be understood that the black-line patterns can represent individual colors, as will be described in further detail. Furthermore, as explained previously, certain sublayers in indicators 302 and 304, or portions thereof, may be transparent and are thus not visible in FIGS. 3A, 3B, 3C, and 3D. Furthermore, as explained previously, when certain sublayers in indicators 302 and 304, or portions thereof, are opaque or colored, the sublayers can obscure or hide other sublayers that are covered thereby. In FIGS. 3A, 3B, 3C, and 3D, indicator 302 is shown having a first portion 302-1 and a second portion 302-2 that may depict different thermal exposure indications, by comprising different thermochromic compositions, as explained previously with respect to first portion 114-1 and second portion 114-2 of third sublayer 114 (see FIG. 1), for example.

Specifically, as shown in FIGS. 3A, 3B, 3C, and 3D, indicator 302 corresponds to first multilayer indicator 100 (see FIG. 1), while indicator 304 corresponds to second multilayer indicator 200 (see FIG. 2), as described above. As noted above, indicators 302 and 304 are multifunctional thermal exposure indicators, as disclosed herein. Indicator 302 is enabled to show thermal exposure indications for overtemperature conditions, while indicator 304 is enabled to show thermal exposure indications for undertemperature conditions.

Indicators 302 and 304 are shown as labels or stickers in FIGS. 3A, 3B, 3C, and 3D that may be affixed to packaged medication 300, such as by adhesion or bonding. Because a mass of indicators 302 and 304 is very small with respect to an overall mass of packaged medication 300, indicators 302 and 304 are enabled to substantially remain in local thermal equilibrium with packaged medication 300. Furthermore, an interface between packaged medication 300 and indicators 302 and 304 may be selected for enhanced thermal conductivity. For example, an adhesive that is thermally conductive can be used to affix indicators 302 and 304 to packaged medication 300, such as at surfaces 120, 220 (see FIGS. 1 and 2). In another example, metallic foil sublayers 108, 208 may serve to enhance thermal conductivity of indicators 302 and 304 at surfaces 120, 220, which may, in turn, promote local thermal equilibrium. Because indicators 302 and 304 substantially remain in local thermal equilibrium with packaged medication 300, indicators 302 and 304 substantially remain at the same temperature as packaged medication 300. Thus, indicators 302 and 304 can be used for thermal exposure monitoring of packaged medication 300.

Figure 3A:
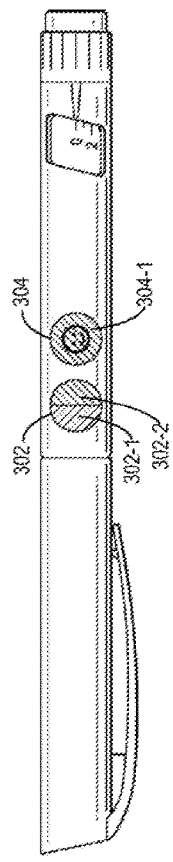
Figure 3B:
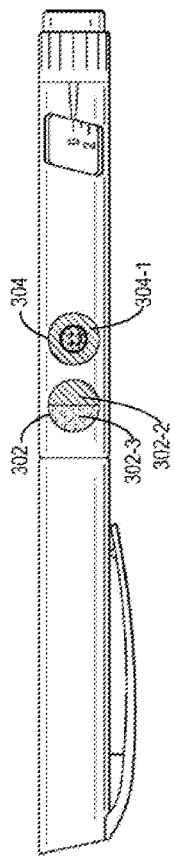

In operation of indicator 302, FIG. 3A shows packaged medication 300-1 that is in a normal thermal condition (no overtemperature, no undertemperature). Accordingly, indicator 302 shows a first portion (corresponding to first portion 114-1) showing a second color 302-1 that corresponds to a normal or safe condition for packaged medication 300-1. For example, second color 302-1 can be a dark green color that is opaque. Meanwhile, in packaged medication 300-1, indicator 302 shows a second portion (corresponding to second portion 114-2) showing a fourth color 302-2 that also corresponds to a normal or a safe condition. For example, fourth color 302-2 can be a green color that is opaque. FIG. 3B shows packaged medication 300-2 that is in a slight overtemperature condition or in a temporary overtemperature condition. Accordingly, in packaged medication 300-2, the first portion of indicator 302 has reversibly transitioned to a transparent color (not visible) while in the first portion, first color 302-3 is now visible (corresponding to sublayer 112). It is noted that when the overtemperature condition abates after a short time, the appearance of packaged medication 300-2 may revert back to the appearance of packaged medication 300-1. In one example, first color 302-3 may be a yellow color, such as to indicate a warning. In packaged medication 300-2, the second portion of indicator 302 remains showing fourth color 302-2. FIG. 3C shows packaged medication 300-3 that is in a significant overtemperature condition that has endured for a period of time, such that the contents of packaged medication 300-3 may have become degraded and are not longer usable. Accordingly, in packaged medication 300-3, first design 302-4 (corresponding to sublayer 110) can appear at indicator 302 in an irreversible manner. First design 302-4 may be a static design having a pattern and a background color that are static and are not thermochromic, shown as an exemplary ⊗ pattern. The background color for first design 302-4 may further indicate degradation or an alarm, such as a red color. First design 302-4 can appear after first color 302-3 and fourth color 302-2 have transitioned to transparent, subsequently to second color 302-1 having transitioned to transparent, as a result of a sustained overtemperature condition. In FIG. 3D, indicator 302-4 is shown in the same normal (no overtemperature) condition as indicator 302-1 (see FIG. 3A).

In operation of indicator 304, FIGS. 3A, 3B, and 3C show packaged medication 300-1, 300-2, 300-3 that has not been subject to any undertemperature thermal condition. Accordingly, these instances of indicator 304 show a normal or acceptable condition, in the form of second design 304-1 (corresponding to sublayer 210). Second design 304-1 may be a static design having a pattern and a background color that are static and are not thermochromic, shown as an exemplary pattern. The background color for second design 304-1 may further indicate a normal or safe condition, such as a green color. The appearance of second design 304-1 indicates that packaged medication 300 has not been exposed to an undertemperature condition, such as a deep freeze, that would render the contents of packaged medication 300 unusable. After packaged medication 300 has been subject to such an undertemperature condition, shown as packaged medication 300-4 in FIG. 3D, indicator 304 shows fifth color 304-2 (corresponding to sublayer 212). Specifically, sublayer 212 in indicator 300-4 that covers sublayer 210 is shown having transitioned from transparent to fifth color 304-2. For example, fifth color 304-2 may degradation or an alarm, such as a red color. Because the undertemperature condition can render packaged medication 300 unusable or unsafe, the appearance of fifth color 304-2 can be irreversible in typical conditions.

In the above description of first multilayer indicator 100 and second multilayer indicator 200, sublayers 112, 114, and 212 have been described with thermochromic functionality. The thermochromic functionality can be implemented using organic micro-encapsulated thermochromic pigment in an organic solvent substrate. Specifically, the thermochromic pigment can be comprised of encapsulated leuco dyes in a mixed co-solvent substrate. The mixed co-solvent substrate can comprise dibutyl phthalate and oleic acid predominant triglyceride solutions, for example.

A functional feature of the thermochromic pigments that is useful for capturing thermal loading is a dynamic lag or hysteresis between energy input and energy output from the interaction of the pigment and the solvent substrate. The selection of a specific pigment and solvent substrate can be chosen to 'tune' the sublayer to a given application, or range of threshold temperatures, for example.

To determine the color forming agent in a sublayer, any of a variety of encapsulated leuco dyes can be used. In one example of encapsulated leuco dyes, compounds derived from anthraquinone and phthalocyanine can be used. Dibutyl phthalate can be used as a plasticizer, with an oleic acid serving as a liquid fatty acid, such as derived from olive oil, which is readily available. The fatty acid may shift pH with temperature to enable selection of a color by different solvent reactions with the leuco dye.

As disclosed herein, a multifunctional thermal exposure indicator can provide immediate reversible indications of overtemperature as well as irreversible indications of excessive thermal loading. Additionally, the multifunctional thermal exposure indicator can provide semi-reversible indications of undertemperature thermal loading, such as exposure to temperatures below the freezing point of water.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A thermal exposure indicator, comprising:
 a first multilayer indicator enabled for affixing to an object to be monitored for thermal exposure, the first multilayer indicator further comprising:
  a first sublayer comprising a first design that is non-thermochromic;
  a second sublayer in contact with and overlaid on the first sublayer, the second sublayer comprising a first thermochromic pigment that irreversibly transitions from a first color to transparent when exposed to temperatures exceeding a first threshold temperature for longer than a first duration, wherein when the second sublayer is transparent, the first sublayer is visible through the second sublayer;
  a third sublayer in contact with and overlaid on the second sublayer, the third sublayer further comprising:
   a first portion comprising a second thermochromic pigment that is reversible from a second color to a third color depending on whether the temperatures exceed a second threshold temperature that is lower than the first threshold temperature, wherein the third color is opaque or transparent; and
   a second portion comprising a third thermochromic pigment that undergoes a transition from a fourth color to transparent depending on whether the temperatures exceed a third threshold temperature for a second duration, wherein when the second portion is transparent, the second sublayer is visible through the second portion, and wherein the second portion remains irreversible with respect to the transition when the temperatures exceed a fourth threshold temperature.

2. The thermal exposure indicator of claim 1, further comprising:
 a second multilayer indicator enabled for affixing to the object, the second multilayer indicator further comprising:
  a fourth sublayer comprising a second design that is non-thermochromic; and a fifth sublayer in contact with and overlaid on the fourth sublayer, the fifth sublayer comprising a fourth thermochromic pigment that transitions from transparent to a fifth color depending on whether the temperatures fall below a fifth threshold temperature.

3. The thermal exposure indicator of claim 1, wherein the first portion and the second portion each cover about half of a surface area of the third sublayer.

4. The thermal exposure indicator of claim 1, wherein the first sublayer, the second sublayer, and the third sublayer cover about the same surface area and are aligned with each other.

5. The thermal exposure indicator of claim 1, wherein the third threshold temperature ranges from about 27.8° C. to about 29.4° C. and the second duration is at least 15 minutes.

6. The thermal exposure indicator of claim 1, wherein the first threshold temperature is about 29.4° C. and the first duration is at least 60 minutes.

7. The thermal exposure indicator of claim 1, wherein the first threshold temperature is about 35° C. and the first duration is at least 15 minutes.

8. The thermal exposure indicator of claim 1, wherein visibility of the first design indicates excessive thermal exposure of the object.

9. The thermal exposure indicator of claim 2, wherein visibility of the second design indicates no excessive cold exposure of the object.

10. The thermal exposure indicator of claim 2, wherein the first multilayer indicator and the second multilayer indicator are affixed to:
　a sixth sublayer comprising a thin metallic foil, wherein the sixth sublayer is enabled for affixing to the object, and wherein the first multilayer indicator and the second multilayer indicator are covered with:
　a seventh sublayer comprising a transparent layer that is insulating and protective.

11. The thermal exposure indicator of claim 1, wherein the object comprises a packaging enabled for storing contents of the object, and wherein the object being monitored for thermal exposure further comprises the contents being monitored for thermal exposure.

12. The thermal exposure indicator of claim 11, wherein the contents comprise a medication.

13. The thermal exposure indicator of claim 12, wherein the object is an insulin pen and the medication comprises an insulin.

14. The thermal exposure indicator of claim 1, wherein the first multilayer indicator is circular in shape, and wherein both the first portion and the second portion are semicircular in shape.

15. The thermal exposure indicator of claim 1, wherein appearance of the third color or the first color indicates an overtemperature condition of the object.

16. The thermal exposure indicator of claim 1, wherein appearance of the fourth color indicates no permanent thermal damage to the object.

17. The thermal exposure indicator of claim 2, wherein appearance of the fifth color indicates excessive cold exposure of the object.

18. The thermal exposure indicator of claim 1, wherein the first thermochromic pigment is uniformly distributed over the second sublayer.

19. The thermal exposure indicator of claim 2, wherein the fourth threshold temperature and the fifth threshold temperature are the freezing point of water.

20. An object enabled for thermal exposure monitoring, the object comprising:
　a thermal exposure indicator in contact with the object, the thermal exposure indicator further comprising:
　　a first multilayer indicator enabled for affixing to the object, the first multilayer indicator further comprising:
　　　a first sublayer comprising a first design that is non-thermochromic;
　　　a second sublayer in contact with and overlaid on the first sublayer, the second sublayer comprising a first thermochromic pigment that irreversibly transitions from a first color to transparent when exposed to temperatures exceeding a first threshold temperature for longer than a first duration, wherein when the second sublayer is transparent, the first sublayer is visible through the second sublayer;
　　　a third sublayer in contact with and overlaid on the second sublayer, the third sublayer further comprising:
　　　　a first portion comprising a second thermochromic pigment that is reversible from a second color to a third color depending on whether the temperatures exceed a second threshold temperature that is lower than the first threshold temperature, wherein the third color is transparent or opaque; and
　　　　a second portion comprising a third thermochromic pigment that undergoes a transition from a fourth color to transparent depending on whether the temperatures exceed a third threshold temperature for a second duration, wherein when the second portion is transparent, the second sublayer is visible through the second portion, and wherein the second portion remains irreversible with respect to the transition when the temperatures exceed a fourth threshold temperature.

21. The object of claim 20, wherein the thermal exposure indicator further comprises:
　a second multilayer indicator enabled for affixing to the object, the second multilayer indicator further comprising:
　　a fourth sublayer comprising a second design that is non-thermochromic; and
　　a fifth sublayer in contact with and overlaid on the fourth sublayer, the fifth sublayer comprising a fourth thermochromic pigment that transitions from transparent to a fifth color depending on whether the temperatures fall below a fifth threshold temperature.

22. The object of claim 20, wherein the first portion and the second portion each cover about half of a surface area of the third sublayer.

23. The object of claim 20, wherein the first sublayer, the second sublayer, and the third sublayer cover about the same surface area and are aligned with each other.

24. The object of claim 20, wherein the third threshold temperature ranges from about 27.8° C. to 29.4° C. and the second duration is at least 15 minutes.

25. The object of claim 20, wherein the first threshold temperature is about 29.4° C. and the first duration is at least 60 minutes.

26. The object of claim 20, wherein the first threshold temperature is about 35°° C. and the first duration is at least 15 minutes.

27. The object of claim 20, wherein visibility of the first design indicates excessive thermal exposure of the object.

28. The object of claim 21, wherein visibility of the second design indicates no excessive cold exposure of the object.

29. The object of claim 21, wherein the first multilayer indicator and the second multilayer indicator are affixed to:
   a sixth sublayer comprising a thin metallic foil, wherein the sixth sublayer is enabled for affixing to the object, and wherein the first multilayer indicator and the second multilayer indicator are covered with:
   a seventh sublayer comprising a transparent layer that is insulating and protective.

30. The object of claim 20, further comprising a packaging enabled for storing contents of the object, and wherein the object being monitored for thermal exposure further comprises the contents being monitored for thermal exposure.

31. The object of claim 30, wherein the contents comprise a medication.

32. The object of claim 31, wherein the packaging comprises an insulin pen and the medication comprises an insulin.

33. The object of claim 20, wherein the first multilayer indicator is circular in shape, and wherein both the first portion and the second portion are semi-circular in shape.

34. The object of claim 20, wherein appearance of the third color or the first color indicates an overtemperature condition of the object.

35. The object of claim 20, wherein appearance of the fourth color indicates no permanent thermal damage to the object.

36. The object of claim 21, wherein appearance of the fifth color indicates excessive cold exposure of the object.

37. The object of claim 20, wherein the first thermochromic pigment is uniformly distributed over the second sublayer.

38. The object of claim 21, wherein the fourth threshold temperature and the fifth threshold temperature are the freezing point of water.

* * * * *